July 4, 1939.   H. A. CENTERVALL   2,164,308
POWER OUTPUT CONTROL
Filed Jan. 21, 1936
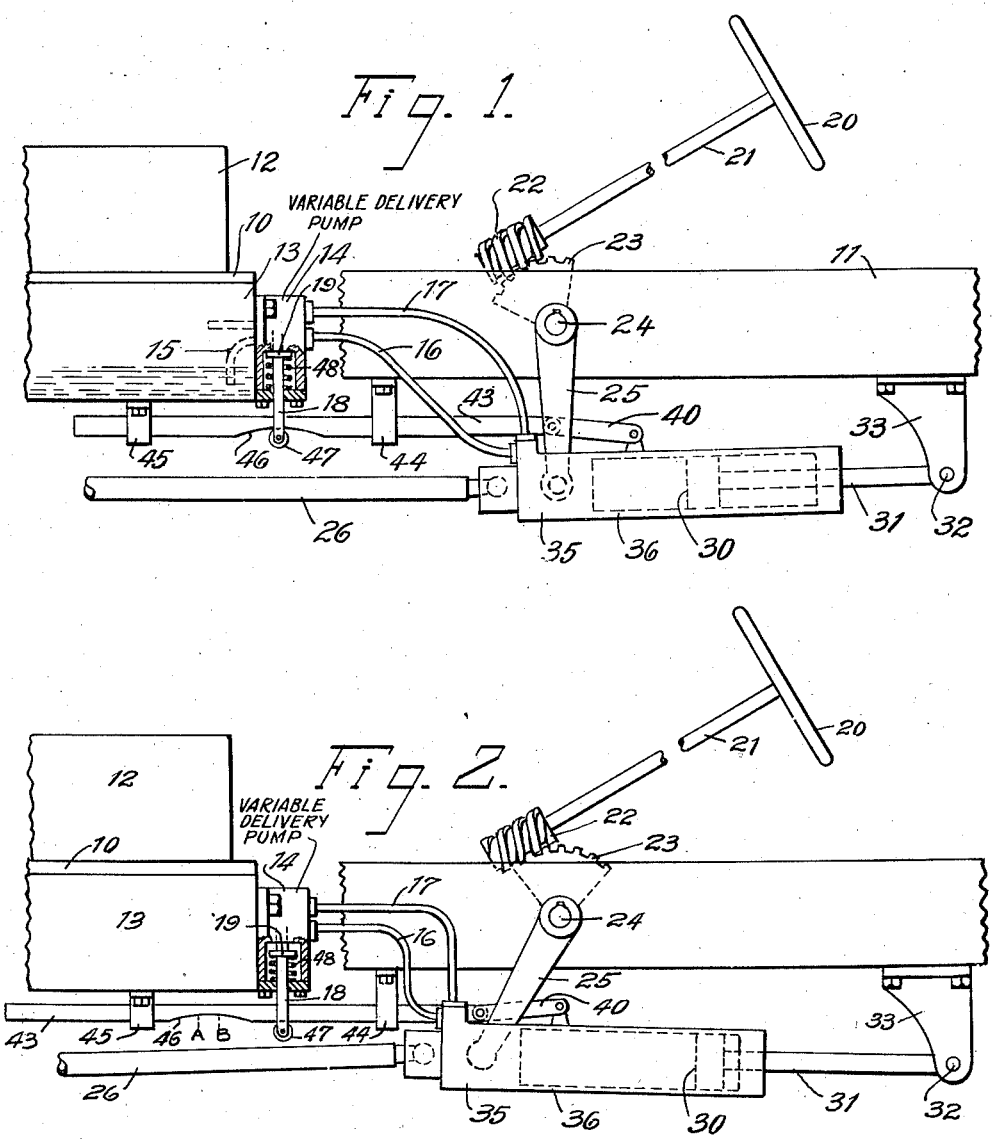
INVENTOR.
HUGO A. CENTERVALL.
BY
ATTORNEYS Patented July 4, 1939

2,164,308

UNITED STATES PATENT OFFICE 2,164,308

POWER OUTPUT CONTROL

Hugo A. Centervall, Brooklyn, N. Y., assignor to Manly Corporation, New York, N. Y., a corporation of Delaware Application January 21, 1936, Serial No. 60,045

10 Claims. (Cl. 60—52)

This invention relates to means for controlling the output from a source supplying power for driven devices and more particularly to means for controlling the output from a source of pressure fluid for the operation of driven devices which are operated intermittently. One important use for it is in connection with fluid pressure operated devices when employed to perform such functions as steering, braking or clutch operation on a motor vehicle. I have accordingly chosen to illustrate the invention as applied to a motor vehicle provided with hydraulic power steering.

In order for the driver to retain full control of the vehicle at all times it is obviously necessary that he be able to turn the steering members any desired amount either as slowly or as rapidly as he may wish. When steering is done by hydraulic power means it is therefore necessary for the source of pressure fluid (usually a pump) to at all times deliver such fluid in a quantity sufficient to cause the hydraulic steering apparatus to move the steering members at whatever rate of speed the driver may wish to employ. In systems heretofore proposed a constant displacement pump usually has been operated by the driving engine of the vehicle but as the speed of the driving engine is subject to wide variation it has been necessary to make the pump of a capacity large enough to deliver the required maximum volume of fluid in the minimum required time with the engine running at low speed. As the speed of the engine increases, the volume of fluid delivered by such a pump increases proportionately so that more fluid is pumped than is needed. This results in power losses which become appreciable at the higher engine speeds and is apt to cause trouble due to heating or to churning of the fluid. If a smaller pump is used, however, the supply of fluid available at the lower engine speeds is insufficient to operate the hydraulic power steering apparatus as rapidly as may be desired.

Under ordinary conditions a motor vehicle, such as the conventional automobile, is operated for the most part while traveling in a substantially straight path and its operation at relatively high speeds is confined largely thereto. There is little or no occasion for any material movement of the steering control members under these circumstances and hence only a small quantity of pressure fluid is required for operation of the hydraulic power steering device. It will be obvious, however, that a constant capacity pump driven by the motor vehicle's engine would frequently be operating at its highest speeds under these conditions and hence would be delivering the maximum quantity of fluid at a time when it is not required. Similarly, sharp turns of the vehicle are usually made at relatively low speeds and hence the constant displacement pump would deliver a relatively small volume of fluid at a time when a maximum amount of pressure fluid is required for the operation of the power steering apparatus.

An object of this invention is to provide simple and effective means whereby the source of power delivers a minimum quantity under normal conditions of operation but makes available the needed increased amount of power whenever the power apparatus is operated beyond its normal limits of use. A more specific object is to provide a practical mechanism of this class for fluid power systems. Other objects will appear from the following description of an illustrative embodiment of the present invention.

In the accompanying drawing:

Fig. 1 is a side elevation of a motor vehicle embodying a preferred form of the present invention shown in schematic arrangement and showing the position of the parts when the vehicle is traveling in a substantially straight path.

Fig. 2 is similar to Fig. 1 and shows the position of the parts when the vehicle is making the sharpest possible turn toward the left.

Referring now to Fig. 1 of the drawing, the vehicle is driven by the usual internal combustion engine 10 which is supported in any preferred manner upon the frame of the vehicle, a portion of one side member 11 of which is shown. The engine comprises the usual cylinder block 12 and crank case 13 and is operatively connected with the rear road wheels, not shown, by means of the usual transmission mechanism, not shown. The speed of the engine may be controlled in any suitable manner.

The fluid circuit includes a pump 14 whose driving shaft, not shown, is operatively connected with the engine 10 in any preferred manner. The inlet or suction port of the pump 14 is connected, as by a pipe 15, with a supply of fluid in the crank case 13 and the appropriate high pressure or discharge pipe 16 leads from the discharge port of the pump 14 and terminates in the control valve mechanism of the hydraulic power steering apparatus. The fluid circuit further includes a suitable return or discharge pipe 17 leading from the hydraulic control mechanism to the interior of the crank case 13. Appropriate safety and exhaust valves, not shown, are also provided by which the maximum pressure of the fluid is limited and excess fluid not needed for the operation of the driven device is returned to the reservoir in the crank case 13 in the customary manner.

The pump 14 may be of any preferred type whose discharge or capacity per revolution may be varied, as for example, the variable capacity pump described in Letters Patent of the United States No. 2,001,706 issued to me on May 21, 1935, which is here shown schematically for purposes of illustration. This variable capacity pump includes rotating radial cylinders fitted with pistons which are caused to reciprocate by a slidably mounted crank mechanism of such design and construction that the length of the stroke of said pistons and hence the capacity of the pump may be varied from maximum to zero by sliding said crank mechanism transverse the axis of rotation. With the parts in the position shown in Fig. 1, the crank mechanism, which is attached to the inner end of the control rod 18, is in its extreme inward position and if desired the arrangement may be made such that the crank mechanism is concentric with the center of rotation. In this position of the crank mechanism, the pump delivers the minimum amount of fluid per revolution, which may be made zero or any desired amount. Outward movement of the crank mechanism by means of similar movement of the control rod 18 causes a corresponding increase in the length of the stroke of the pump pistons and hence in the delivery per revolution of the pump until the crank mechanism reaches its maximum outward or eccentric position as is the case when the parts are in the position shown in Fig. 2.

The steering mechanism includes the usual rotatable steering wheel 20 mounted upon one end of the steering shaft 21 whose lower end is appropriately connected with the usual worm 22 for simultaneous rotation therewith. The worm 22 engages the usual sector 23 which is guided upon one end of the usual rotatably mounted cross shaft 24 to whose other end is fastened the upper end of the pitman arm 25. The arrangement is such that manual rotation of the steering wheel 20 causes the pitman arm 25 to swing in one direction or the other in the usual manner.

The hydraulic power mechanism is shown schematically and may be of any preferred type, as for example, that disclosed in my Patent No. 2,062,296, issued December 1, 1936. As here shown this hydraulic power apparatus includes a stationary piston 30 having a piston rod 31 whose outer end is pivotally connected as at 32 to the depending bracket 33 which is suitably supported upon the side frame member 11. The hydraulic power apparatus also includes a movable cylinder body 35 formed with the usual hydraulic cylinder 36 in which the piston 30 is slidably fitted. The ends of the cylinder 36 are suitably connected with the control mechanism so that when one end of said cylinder is connected with the pressure fluid inlet pipe 16 the other end of said cylinder is connected with the return pipe 17 which leads back to the interior of the crank case 13.

The mechanism, not shown, for controlling the operation of the hydraulic power cylinder is suitably located within the movable cylinder body 35; it is of the well-known follow-up type and is adapted to be actuated by the lower end of the pitman arm 25. The arrangement is such that when the steering wheel 20 is turned in a counter-clockwise direction the pitman arm 25 swings forwardly or toward the left, as viewed in Figs. 1 and 2, and pressure fluid is admitted to the left end of the cylinder 36 which causes the cylinder body 35 and its attached parts to be moved forwardly or toward the left. Similarly, as the steering wheel is turned in a clockwise direction pressure fluid is admitted to the rear or right end of the cylinder 36, as viewed in Figs. 1 and 2, and the cylinder body 35 and its connected parts are moved rearwardly or toward the right.

The movable cylinder body 35 is adapted to be operatively connected with the steered road wheels of the vehicle in order that steering may be effected by power and said cylinder body 35 is attached by the usual ball and socket construction to one end of the usual drag link 26 here shown as broken off. The drag link 26 is presumed to be operatively connected with a conventional front road wheel assembly of an automobile in the usual manner, so that forward movement of said drag link 26 away from its neutral or straight-ahead position, as shown in Fig. 1, moves said front road wheels so as to cause the vehicle to turn toward the left; while rearward movement of said drag link 26 away from its neutral position moves said front road wheels so as to cause the vehicle to turn toward the right.

Means are also provided for altering the position of the control rod 18 and the attached crank mechanism of the pump 14 in order to vary the capacity of said pump. In the present instance the movable cylinder body 35 is pivotally connected to one end of a short link 40 whose other end is pivotally connected with the adjacent end of the cam rod 43. The cam rod 43 is adapted to be freely movable lengthwise but is held against substantial movement in any other direction as by the appropriate supporting means 44 carried by the side frame member 11 and the supporting means 45, here shown carried by the crank case 13. The arrangement is such that the cam rod 43 is moved lengthwise whenever there is corresponding movement of the cylinder body 35, the pivotal connection of the link 40 permitting said link to adjust itself as required by the varying angularity of said cylinder body 35 with respect to said cam rod 43 in the various positions of adjustment of the steering mechanism. The cam rod 43 is provided with an appropriate cam 46 which is adapted to cooperate with a roller or cam follower 47 securely attached to the outer end of the control rod 18. The roller 47 is held against the cam 46 by means of a spring 48 acting against the shoulder 49 formed on the control rod 18. The arrangement is such that the spring 48 forces the control rod 18, and hence the attached crank mechanism of the pump 14, inwardly as far and as rapidly as permitted by the cam 46. Outward movement of the control rod 18 and its attached crank mechanism is effected by lengthwise movement of the cam rod 43 which compresses the spring 48 and forces the control rod 18 outwardly.

It will be evident that the cam 46 determines the position of the roller 47 and the control rod 18 and hence of the crank mechanism of the pump 14. The cam 46 may obviously be of any desired configuration so that the stroke of the pump 14 may be varied between any desired minimum and maximum lengths and so that the variation of the length of the pump stroke may be made to occur at any desired rate. In the present embodiment the cam 46 is formed with a substantially straight central portion A—B, as indicated in Fig. 2. It will be obvious that there will be no change in the length of the pump stroke as long as the roller 47 is in contact therewith. Adjoining the central portion A—B on each of its sides, the cam 46 is formed with curved portions adapted to progressively increase the outward movement of the roller 47 as the cam rod 43 is moved out of its central position as shown in Fig. 1, and hence to progressively increase the stroke of the pump 14 until the stroke of said pump 14 has been brought to its maximum.

When the vehicle is moving in a straight path the parts are substantially in the position shown in Fig. 1 and the variable capacity pump 14 delivers its minimum volume of fluid per revolution. Relatively little movement of the steering members is ordinarily required when the vehicle is traveling on a substantially straight roadway but it is frequently necessary to turn the steering members within a limited range in one direction or the other in order to make adjustments necessitated by irregularities in the surface of the roadway, etc.. This condition obtains for the great majority of time which the vehicle is operated and particularly when it is moving at relatively high speeds. Very little steering of the vehicle is usually then required and a minimum amount of pressure fluid is therefore needed for the operation of the hydraulic power steering apparatus. The substantially straight central portion A—B of the cam 46 is preferably made of such length as to be in contact with the roller 47 when the steering members are moved throughout the limited range of steering required under this condition of travel. The minimum length of the stroke of the pump 14 as thus determined is made such as to supply adequate pressure fluid for the operation of the power steering mechanism throughout this range thus assuring an ample supply of pressure fluid but without any material excess.

When the driver wishes to steer toward the left he turns the steering wheel 20 in a counterclockwise direction and the pitman arm 25 swings forwardly or toward the left, as viewed in Figs. 1 and 2. Pressure fluid is then admitted to the forward or left end of the cylinder 36 and the movable cylinder body 35 and its attached parts are moved forwardly, causing the steered road wheels to move in a direction which turns the vehicle toward the left. As the cylinder body 35 moves forward, it actuates the cam rod 43 which is likewise moved forwardly or toward the left, as viewed in Fig. 1. The cam 46 acting against the roller 47 forces outwardly the control rod 18 and the connected crank mechanism of the variable capacity pump 14 and the volume of fluid delivered by the pump 14 is thus instantaneously increased and made available for movement of the movable cylinder body 35. It will be observed that in the present embodiment the stroke of the pump 14 is brought to its maximum length when the steering mechanism has moved a comparatively short distance beyond its range of normal operation for straight-ahead travel. Fig. 2 shows the position of the parts when the steered road wheels are in such position as to cause the vehicle to make its sharpest possible turn toward the left and it will be observed that the capacity of the pump 14 is maximum. When the steering controls are brought back to their normal or straight-ahead position, as shown in Fig. 1, the cam rod 43 is likewise returned to its normal or central position and the stroke of the pump 14 is thus reduced.

When it is desired to steer the vehicle toward the right, the driver turns the steering wheel 20 in a clockwise direction and the hereinbefore described operation of the steering mechanism is obviously reversed. It will be observed however that the stroke of the pump 14 is increased in the same manner and in substantially the same amount as for a corresponding turn toward the left.

Variations in this arrangement may obviously be made as conditions require. For example, the cam may be made such that the stroke of the pump 14 is at its minimum length when the roller 47 is in contact with a single point of the cam 46, and similarly, the changing of the stroke of the pump from minimum to maximum length may be made to take place almost instantaneously upon relatively small lengthwise movement of the cam rod 43.

It will be observed that movement of the cam rod 43 and hence the movement of the control mechanism of the pump 14 is effected by power from the hydraulic power apparatus. It will further be evident that the device operates to provide a minimum quantity of pressure fluid under conditions when minimum pressure fluid is required but makes available pressure fluid in the needed quantity when steering controls are turned away from their normal or straight-ahead position.

It is to be understood that the above is merely an exemplifying disclosure and that changes may be made in the apparatus without departing from the applicant's invention which is defined in the appended claims.

I claim:

1. In a fluid pressure operated device, a variable stroke pump, a power mechanism operated by fluid delivered by said pump, manually operated control means for said power mechanism, and separate stroke-varying means for said pump acting independently of the operation of the manually operated control means to determine the volume of fluid delivered by the pump at the different points of range of movement of the power mechanism, said stroke-varying means being adapted to effect pump stroke of minimum length upon movement of said power mechanism responsive to movement of said manually operated control means throughout a limited range and to increase said pump stroke upon movement of said power mechanism responsive to movement of said manually operated control means beyond said limited range.

2. In a power steering device, manually movable control means for said device, fluid power means operatively responsive to movement of said control means, steering means operatively connected with said fluid power means, a variable capacity pump for supplying fluid for said fluid power means and separate control means for said variable capacity pump, said separate control means being coordinated with said power steering device and acting independently of the manually movable control means to determine the volume of fluid delivered by the variable capacity pump at the different points of range of movement of the steering means, and to produce a minimum capacity per revolution of said pump upon movement of said steering device throughout a limited range and to increase the capacity of said pump per revolution upon movement of said steering device beyond said limited range.

3. In combination, a variable delivery pump, driven means actuated by fluid delivered by said pump, control means for connecting said pump with said driven means and a separate power output control means for said pump coordinated with said driven means to alter the volume of fluid delivered by said pump simultaneously with the operation of said driven means, said power output control means acting independently of the operation of said first named control means to determine the volume of fluid delivered by the pump at the different points of range of movement of the driven means.

4. In combination, a pump of variable capacity per revolution, a device actuated by fluid delivered by said pump, means for connecting and disconnecting said pump with said device to regulate the operation thereof, and a capacity control mechanism for determining the volume of fluid delivered by said pump, said capacity control mechanism being operated in unison with and solely in response to movement of said driven device to vary and determine the volume of fluid delivered per revolution of said pump conformably with the different points in the range of movement of said driven device.

5. In combination, a power source of variable output, driven means actuated by power delivered by said source, control means for connecting and disconnecting said power source with said driven means to regulate the operation thereof, and control means for said power source separate from and independent of said first named control means and coordinated with said driven means to alter the output of power from said source simultaneously with the operation of said driven means and conformably with the position of said driven means in its range of movement.

6. In combination, a power source of variable output, driven means actuated by power delivered by said source, follow-up control means regulating the operation of said driven means, said follow-up control means including a manually movable member and being actuated by relative movement between said manually movable member and said driven means, and power output control means for said power source coordinated with said driven means and actuated solely in response to movement thereof to alter the power output from said source, said manually movable member acting solely through said follow-up control means to produce relative movement of said manually movable member with respect to said driven means.

7. In a power steering device, a power source of variable output, driven means actuated by power from said source, steering means operated by said driven means, steering control means operable to control the operation of said driven means and said steering means, and separate power output control means for said power source coordinated with said driven means and actuated solely in response to movement thereof to alter the power output from said source conformably with the different positions of said driven means in its range of movement.

8. In combination, a power source of variable output, driven means actuated by power delivered by said source, control means for connecting and disconnecting said power source with said driven means to regulate the operation thereof, and separate power output control means for said power source coordinated with said driven means, said power output control means acting independently of said first named control means to cause a predetermined variation in the relative output of power from said source conformably with the different points in the range of movement of the driven means.

9. In combination, a fluid power source of variable output, driven means actuated by fluid power delivered by said source, control valve mechanism for regulating the operation of said driven means, and separate fluid power output control means for said power source, said fluid power output control means acting independently of the operation of said first named control means and being responsive solely to the operation of said driven means to regulate the relative fluid power output from said source at different points in the range of movement of said driven means.

10. In combination, a variable delivery pump, a device actuated by fluid delivered by said pump, means for connecting and disconnecting said pump with said device and a power output control for determining the volume of fluid delivered by said pump, said output control being operated in unison with and solely in response to movement of said device to vary and determine the relative volume of fluid delivered by the pump at the different points of range of movement of the driven device.

HUGO A. CENTERVALL.